Aug. 5, 1941.  G. A. GILLEN  2,251,673
INDUCTION MOTOR
Filed March 15, 1939
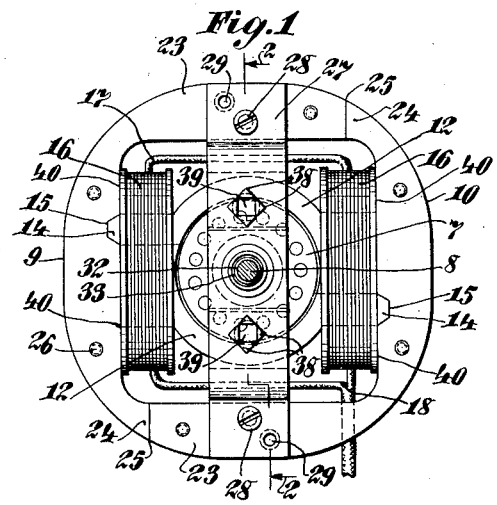
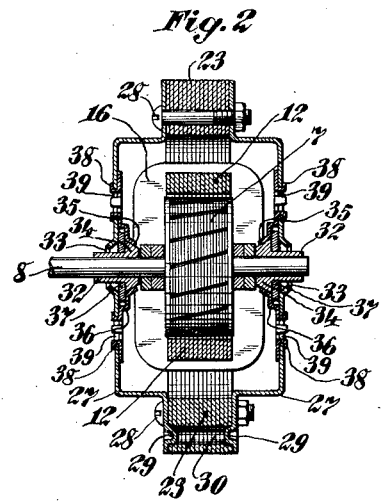
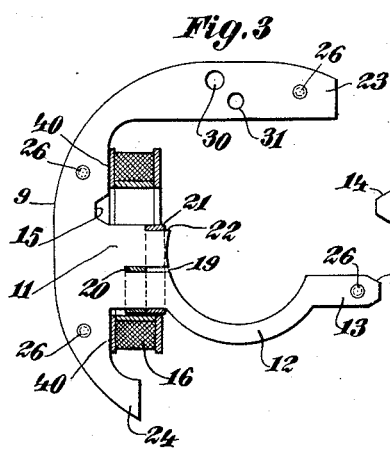
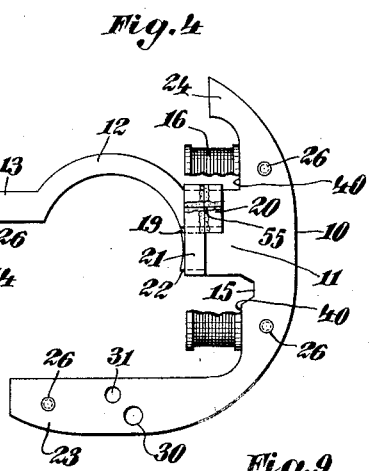
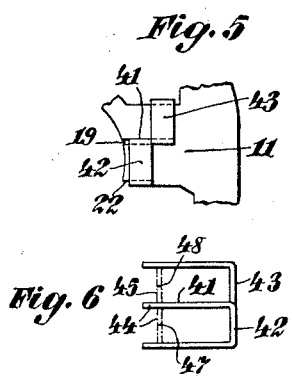
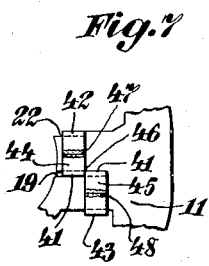
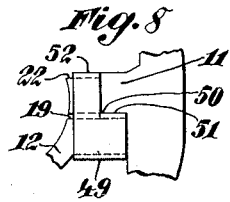
INVENTOR.
George A. Gillen,
BY
ATTORNEY.

Patented Aug. 5, 1941

2,251,673

UNITED STATES PATENT OFFICE 2,251,673

INDUCTION MOTOR

George A. Gillen, Bronx, N. Y., assignor to Fuel & Metal Research Corporation, Brooklyn, N. Y., a corporation of New York Application March 15, 1939, Serial No. 261,954

6 Claims. (Cl. 172—278)

The present invention relates to electrical machines in the nature of induction motors.

Special objects of the invention are to provide a machine of this character, of improved electrical characteristics and mechanical construction, simplified in design and of reduced cost and consisting of but few simple parts, which can be readily assembled.

Other desirable objects and the novel features of construction, combinations and relations of parts whereby such objects are attained, are set forth in the following specification, illustrated in the accompanying drawing and broadly covered in the claims following.

The drawing illustrates one of the practical commercial embodiments of the invention. The structure however may be modified and changed in various ways, all within the true intent and broad scope of the invention hereinafter defined and claimed.

Fig. 1 is a face view of an induction motor embodying the invention, the shaft of the motor appearing in section.

Fig. 2 is a vertical cross-sectional view taken on the line 2—2 of Fig. 1.

Figs. 3 and 4 are face views of the two sets of field laminations, with the double shading coils, the coils being shown in section in Fig. 3.

Figs. 5, 6, 7 and 8, 9, 10 are detail views of two different forms of shading coil copper.

In the machine illustrated, the rotor 7, is of conventional squirrel-cage design having a shaft 8.

The field is of special novel design involving counter-part field segments 9, 10, Figs. 3, 4, cooperating in reversed relation to form poles with integral extensions completely encircling the rotor and connected by outer integral portions forming a complete magnetic return circuit.

The main pole forming portions of the segments are designated 11, and these are shown as having arcuate extensions 12, projecting from one edge and terminating in pole completing projections 13, with tapered ends 14, to wedge into correspondingly tapered seats 15, of the companion pole segments. When engaged thus, as shown in Fig. 1, the portion 11, of one segment and the adjoining portion 13 of the opposing segments form one complete pole for a winding 16. With two windings as shown, these are ordinarily connected together in series relation as at 17, Fig. 1, and the other ends of the connected coils are brought out to the external circuit as indicated at 18.

This made up form of pole construction facilitates use of double shading coils. The main polar projections are shown slotted at 19, to receive small shading coils and larger shading coils 21 are shown engaged about the main pole pieces 11, partly seated in the cutback or shouldered portions 22, in the sides of the pole pieces facing the supplemental polar portions 13. By thus seating the outer shading coils, the latter set into the edges of the main poles, so as not to hold the supplemental polar portions 13, away from the main portions 11.

At the back of the main pole portions 11, the field segments are shown as extended at one side with a long arm 23, and at the opposite side with a shorter arm 24, said long and short arms abutting at 25, Fig. 1, in the reversed relation of the segments to provide a complete outer circular magnetic return circuit.

The laminations of each set are indicated as secured together by through rivets or like suitable fastenings 26, and the two thus unified sets of segments are shown as secured together in their cooperating reversed relation by the bearing brackets 27, which are held together at opposite sides of the field segments by through bolts 28, passing through the long arms 23, of the respective segments. To enable these brackets to accurately locate and draw the segments firmly together, said brackets are shown as having integral tapered "drift pin" projections 29, on their inner faces entering corresponding openings 30, provided in the segments at one side of the passages 31, for the holding screws 28.

Self-aligning bearings are preferably provided for the shaft, particularly to overcome any possible misalignment, which otherwise might result from possible distortion of the brackets 27, in clamping the field parts together. In the illustration, these bearings are shown as bearing sleeves or bushings 32, projecting freely through larger openings, 33, in the brackets and having conical faced heads or flanges 34, at their inner ends engaged in conical seats 35, in the spring plates 36, secured to the inner faces of the bearing brackets. The bushings 32, may be of porous bearing metal to take lubricant from the felt or other lubricant saturated washers 37, back of the flanges 34, and confined by the strips 38, against the inner faces of the brackets.

The self-centering action of the bearing brackets, plus the self-aligning and self-lubricating features of the bearings, enable quick accurate assembly of the parts and assure long continued smooth running operation.

To facilitate quick and accurate assembly of the self-aligning bearings on the brackets, the holding plates 36, are shown as having spurs 38, struck therefrom, extended through openings 39, and bent over the outer faces of the brackets, in the nature of integral rivets. These locate and firmly secure the bearing confining plates accurately in position on the brackets, avoiding all use of separate fastenings.

The field laminations are all alike and can be produced at low cost in a simple stamping operation. The two halves of the field frame are made up by simply riveting or otherwise securing together the required number of laminations. If separately formed, the smaller shading coils 20 may be entered in the slots 19, and the ends brought together and the larger shading coils 21, be similarly formed about the cutback or shouldered portions 22, against the inner coils. If desired, these shading coils may be soldered or otherwise secured together. The magnetizing coils 16, may then be passed over the pole extensions to a definite position of rest against the abutment faces 40, at the back of and to either side of the main pole pieces 11. Then in the relatively reversed relation indicated in Figs. 3, 4, the field segments can be brought straight together to cause the supplemental pole extensions 13, to pass through the coils and into the seats 15, at the sides of the main pole pieces. In thus filling out and completing the main pole portions, these supplemental pole pieces may completely fill up the space within the magnetizing windings, thus to form poles completely filling the magnetizing windings. These coils therefore can be made of an exact size to fit the poles and they do not have to be stretched or distorted in any way to get them in final position on the poles. Further, when so engaged over the poles they may be held seated against the back walls 40, by the arched portions 12, of the pole extensions. Final assembly can then be completed by passing the rotor into the completed circular polar ring provided by the main poles and integral supplemental pole extensions and then engaging the bearings over the shaft ends and securing the bracket portions of such bearings in their piloted positions on the field sections.

The shading coils, instead of being made as two separate coils may be made of a single integral piece of copper, cut to fit in the pole slot 19, and to provide arms embracing the main polar projection 11. In the embodiment shown in Figs. 5, 6, 7, there is an intermediate relatively wide strip of copper 41, seating in slot 19, with split apart portions 42, 43, at one end of the same which wrap around the opposite sides of the pole, Fig. 5, and which branched extensions are bent at the opposite ends, Fig. 6, to meet the bent portions 44, 45, split at 46, from the opposite end of the wide section 41. These meeting ends which may be bent together after the partly formed copper is first slipped endwise over the pole may then be secured together by soldered joints indicated at 47, 48, Fig. 7.

The form of copper illustrated in Figs. 8, 9, 10, differs from the last described, in that the full width portion 49, of the strip is at one side of the pole and that the branches are split and extend only from one end of the wide portion. Thus as shown in Fig. 8, only one end of the wide strip is split as at 50, and one branch 51, thereby provided extends through slot 19, while the other branch 52, extends around the shouldered portion 22, of the pole. The ends of both branches are made long enough to reach the folded down end 53, Fig. 10 of the full width section 49. This enables the ends of both the short branch 51 and the longer branch 52, to be secured to the end of the full width portion by a single continuous soldered joint 54. This form of copper, like the last described, also may be slipped endwise through the slot and over the sides of the pole, after the manner indicated in Fig. 9, and the projecting ends then bent together and soldered as in Fig. 10. In this last form, the copper is held in place behind the polar extension or horn 12. This is true also of the first form, where there the two separate rings 20, 21, are soldered together as indicated at 55, Fig. 4, to constitute a single unit.

If desired, an automatic centrifugal switch or other switch mechanism may be provided for starting with the stator coils in parallel relation and then changing to a series running condition. Other changes may be made within the broad scope of the invention.

What is claimed is:

1. In an electrical machine of the character disclosed, a stator having pole pieces each provided with only a single horn projecting from one side of the same into position alongside the hornless side of an adjoining pole piece, said pole pieces being slotted and a double shading coil on each pole piece, each coil providing a plurality of closed circuits, one about the entire pole piece and another about only a portion of the pole piece.

2. In an electrical machine of the character disclosed, a stator having pole pieces each provided with only a single horn projecting from one side of the same into position alongside the hornless side of an adjoining pole piece, said pole pieces being slotted and unitary conductor bars each slit and bent to form separate closed branches, with the different portions of each conductor bar engaged about a pole piece and within the slot in the same.

3. An electrical machine, comprising a stator with directly opposite poles composed of two complemental portions, each having a single pole piece with a single substantially semi-circular horn projecting from one side of the same and terminating in a polar projection of substantially the extent of and positioned to lie at the hornless side of the other pole piece, said stator portions having extensions at the sides of said pole pieces meeting in the assembled relation of said portions, stator coils surrounding said pole pieces and the polar projections at the sides of the same and a rotor journalled to rotate between said pole pieces.

4. As a new article of manufacture, a shading coil member, comprising a relatively wide strip of conducting material slit longitudinally a portion of its length to form two narrower branches and said narrower branch portions being bent to form closed coils, one alongside the other, the unslit portion of the strip being common to both coils.

5. As a new article of manufacture, a shading coil member comprising a strip of conducting material slit longitudinally a portion of its length to form narrower branch portions connected at the base by a wider unslit portion of the strip and said branch portions being bent into closed coils integrally connected by the wider portion in side-by-side relation.

6. A two pole electric motor with poles directly opposite each other and comprising a stator of two part construction, each part of said stator including a single pole piece with a single substantially semi-circular horn projecting from one side of the same and terminating in a straight polar projection, substantially the same polar extent and positioned to lie at the hornless side of the opposite pole piece, said two complemental stator parts having frame extensions at opposite sides of said pole pieces meeting to form a complete outer ring in the assembled relation of said stator parts, stator coils surrounding said pole pieces and the complemental polar projections at the sides of said pole pieces and a rotor journalled to rotate within the continuous inner ring provided by said pole pieces, projecting horns and polar projections.

GEORGE A. GILLEN.